May 7, 1968  S. D. CAPPOTTO ET AL  3,381,791
TYPEWRITER CARRIAGE CONTROL
Filed Oct. 5, 1965  3 Sheets-Sheet 1
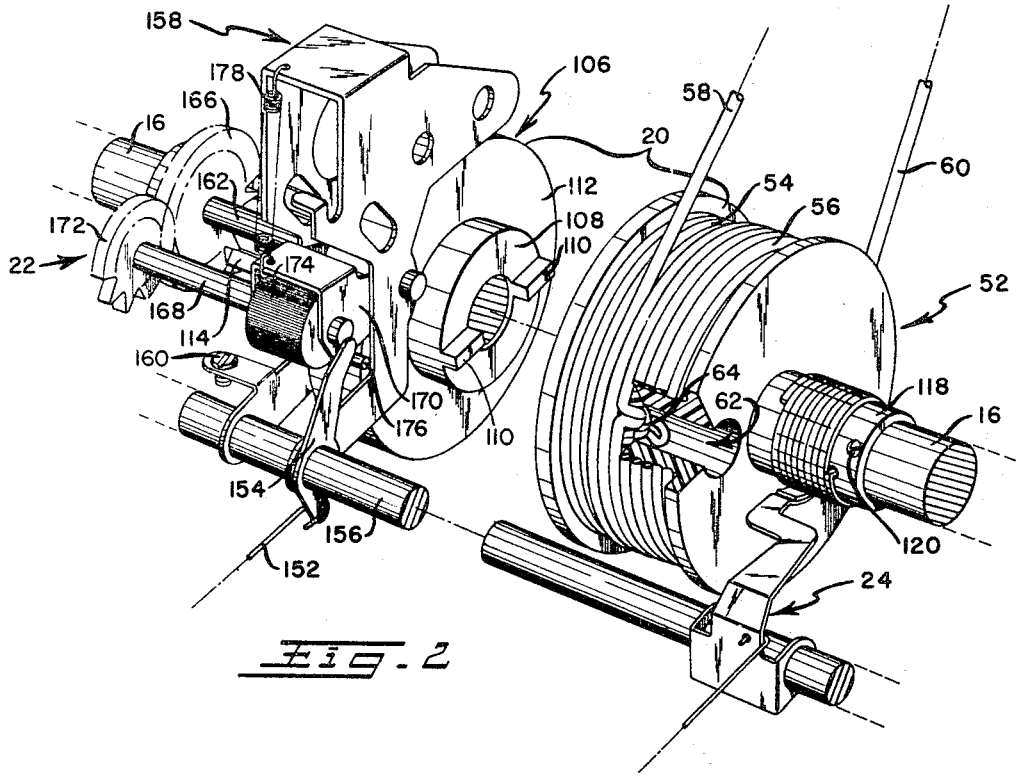
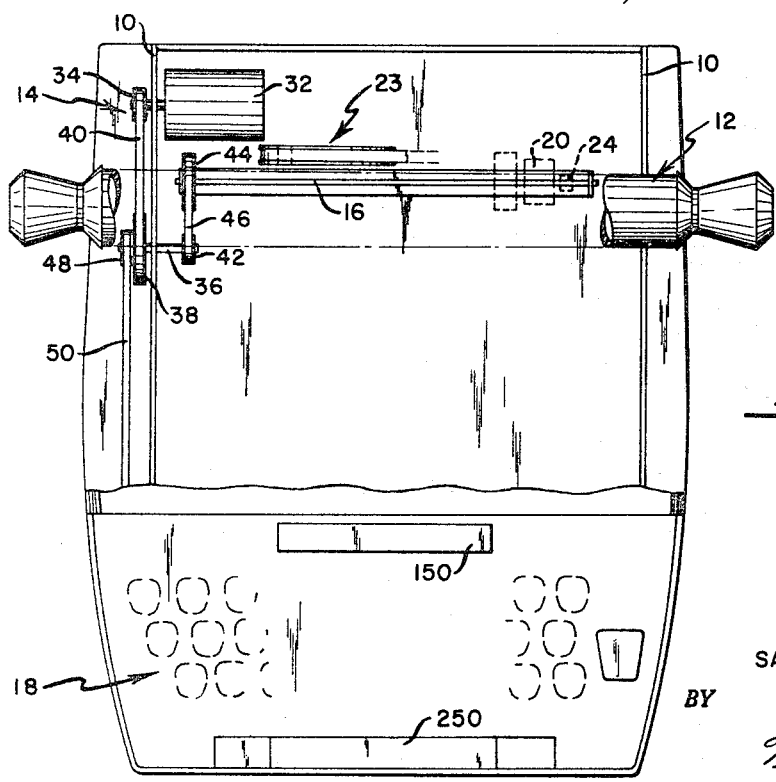
INVENTORS:
SAMUEL D. CAPPOTTO
CARL P. ANDERSON
BY
Kenneth H. Gieb
AGENT

INVENTORS:
SAMUEL D. CAPPOTTO
CARL P. ANDERSON

BY Kenneth H. Grub

AGENT

INVENTORS:
SAMUEL D. CAPPOTTO
CARL P. ANDERSON

United States Patent Office 3,381,791
Patented May 7, 1968

3,381,791
TYPEWRITER CARRIAGE CONTROL
Samuel D. Cappotto, Syracuse, and Carl P. Anderson, Homer, N.Y., assignors to SCM Corporation, New York, N.Y., a corporation of New York
Filed Oct. 5, 1965, Ser. No. 493,098
8 Claims. (Cl. 197—64)

ABSTRACT OF THE DISCLOSURE

Typewriter or the like having a carriage movable transversely of a print point and a non-stepping carriage advancing mechanism operatively connected to a power source for controlling the movement of the carriage in the letter feed direction at a rate less than a normal tabulation rate. The non-stepping mechanism includes a continuously rotating gear train, a normally idle wheel connected to the carriage and a key operable linkage for frictionally coupling the rotating gear train to the wheel for controlling the carriage movement in the letter feed direction.

---

This invention relates to typewriters or like machines and more particularly to novel carriage control means including means to move the carriage in the letter feed direction independently of the escapement and tabulating mechanism.

It has been desirable for operators to be able to advance the carriage in the letter feed direction at short intervals, such as 3 to 20 letter spaces, without repeatedly depressing a space bar and without using the conventional tabulator feature. Repeatedly depressing the space bar is too slow and inconvenient and the carriage moves too fast during a tabulation run making it difficult to stop the carriage close to the desired carriage setting. An example of a power driven tabulator mechanism is shown by United States Patent 864,601, issued Aug. 27, 1907, to G. C. Blickensderfer. However, most electric typewriters and a recently introduced manual typewriter have provided an acceptable means for advancing the carriage at short intervals by providing an automatically repetitive space bar mechanism that actuates the carriage controlling escapement. An example of this means is shown by United State Patent 2,896,767, issued July 28, 1959 to J. P. Barkdoll, for Spacing Mechanism for Power Operated Typewriters.

Advancing the carriage in the letter feed direction at short intervals by repeatedly actuating the carriage controlling escapement abruptly stops the carriage at each letter space increment. A disadvantage of this repetitive abrupt stopping of the carriage is that it causes wear on the escapement and space bar, as well as induces an undesirable vibration to the entire machine. Another and perhaps a more critical disadvantage is a resultant highly undesirable noise.

It is therefore the object of this invention to eliminate the above identified disadvantages by providing a carriage control means for advancing the carriage in the letter feed direction at short intervals independently of the carriage controlling escapement mechanism.

Another object of this invention is to provide a non-stepping carriage control means (referred to as a space glide means) for advancing the carriage in the letter feed direction at short intervals at a rate less than the tabulation rate thus substantially improving the operator's capability of accurately stopping the carriage at the desired carriage setting.

Another object of this invention is to provide a space glide means that advances the carriage faster than the automatic repetitive space bar mechanism and yet slower than the tabulator rate thereby providing an operator control means for advancing the carriage at short intervals fast and accurately.

Another object of this invention is to provide keyboard control means for the space glide means.

Other objects and further novel features of the present invention will become more fully apparent from the appended claims and from the ensuing detailed description and discussion when read in conjunction with the accompanying drawings, in which:

FIGURE 1 is a partial top plan view of a typewriter showing the keyboard orientation of the feature keys and the power drive train of the present invention;

FIGURE 2 is a front perspective view showing the tabulator governing means and carriage return power driving means;

Figure 5:
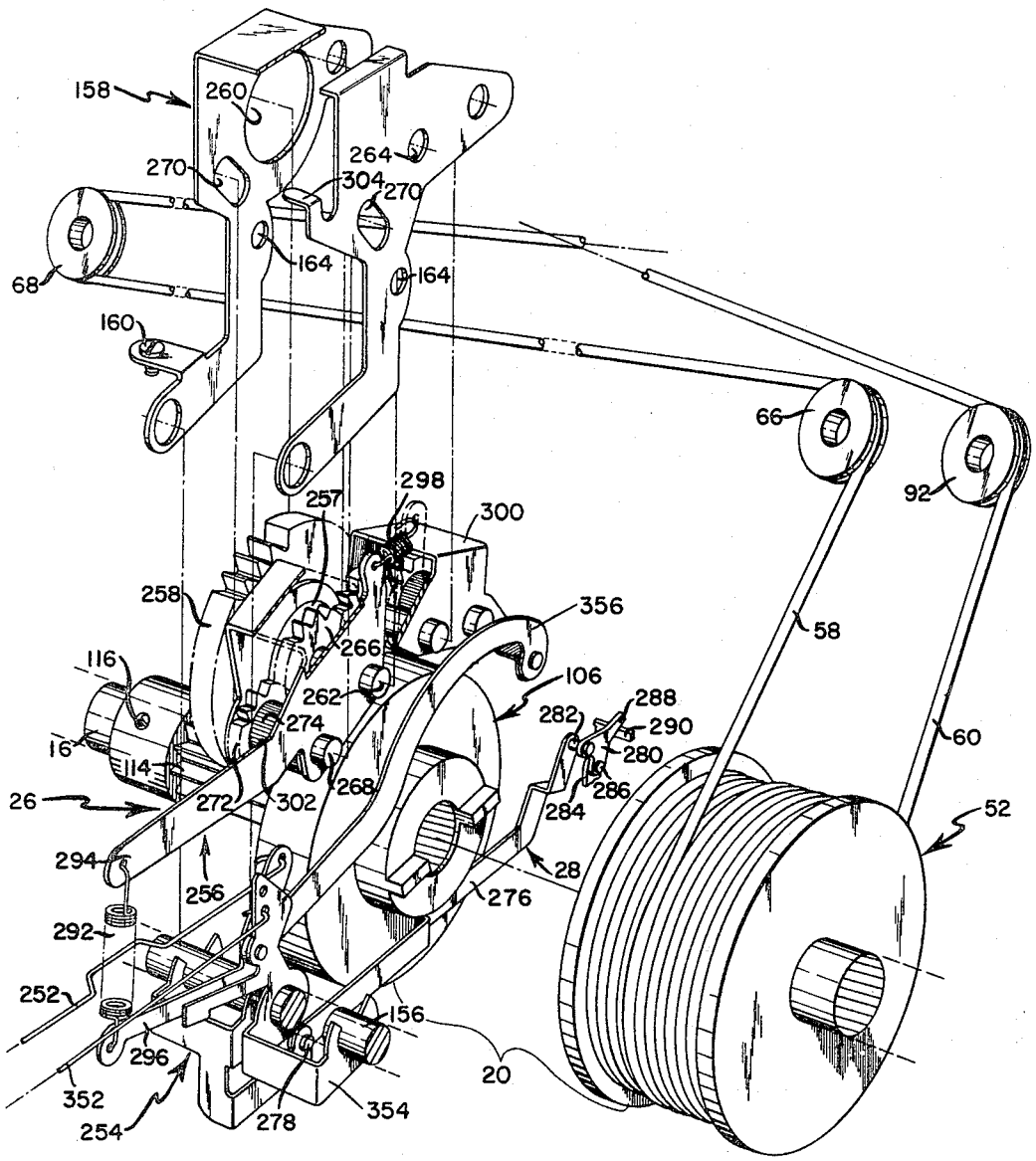
FIGURE 5 is a front perspective view showing a means for governing the carriage movement in the letter feed direction at a rate less than the tabulation rate.

Referring now to the drawings, FIGURE 1 illustrates a typewriter having a frame 10, a carriage 12, a speed reduction power drive train 14 for driving a shaft 16, and a keyboard 18. FIGURE 2 includes a carriage connecting means 20, a tabulator mechanism 22 for connecting shaft 16 to the carriage connecting means 20 for governing the movement of the carriage 12 in the letter feed direction under the influence of a conventional mainspring 23 (FIG. 1) at a predetermined tabulation rate, and a carriage return mechanism 24 for connecting shaft 16 to the carriage connecting means 20 for driving the carriage 12 in the return direction at a predetermined carriage return rate. FIGURE 5 shows a space glide means 26 for connecting shaft 16 to the carriage connecting means 20 for governing the movement of the carriage in the letter feed direction at a rate less than the tabulator mechanism 22. The space glide means 26 includes a linkage 28 for disabling a conventional carriage controlling escapement, which permits the mainspring 23 to advance the carriage thereby eliminating the stepping movements of the conventional repeat spacing mechanisms.

Power drive train

The speed reduction power drive train 14 includes a motor 32 (FIGURE 1) having a V-type pulley 34 rigidly assembled on a shaft extending therefrom. An intermediate shaft 36, rotatably supported by frame 10 forward of motor 32, has a V-type pulley 38 rigidly assembled thereto near its left end. A V-belt 40 connects pulley 34 to pulley 38. Shaft 36 has a second V-type pulley 42 rigidly assembled thereto near its right end. A V-type pulley 44 is rigidly assembled to the left end of shaft 16 having a V-belt 46 connecting it to pulley 42. Shaft 16 is rotatably supported in the framework by conventional means and is rotated clockwise as viewed from the right side of the machine. A third V-type pulley 48 is rigidly assembled to the extreme left end of the intermediate shaft 36 having a V-belt 50 connecting it to a conventional toothed snatch roll (not shown) for power operated printing actions and other instrumentalities. Thus it can be seen that shaft 16 is power driven by power drive train 14.

Carriage connecting means

Figure 3:
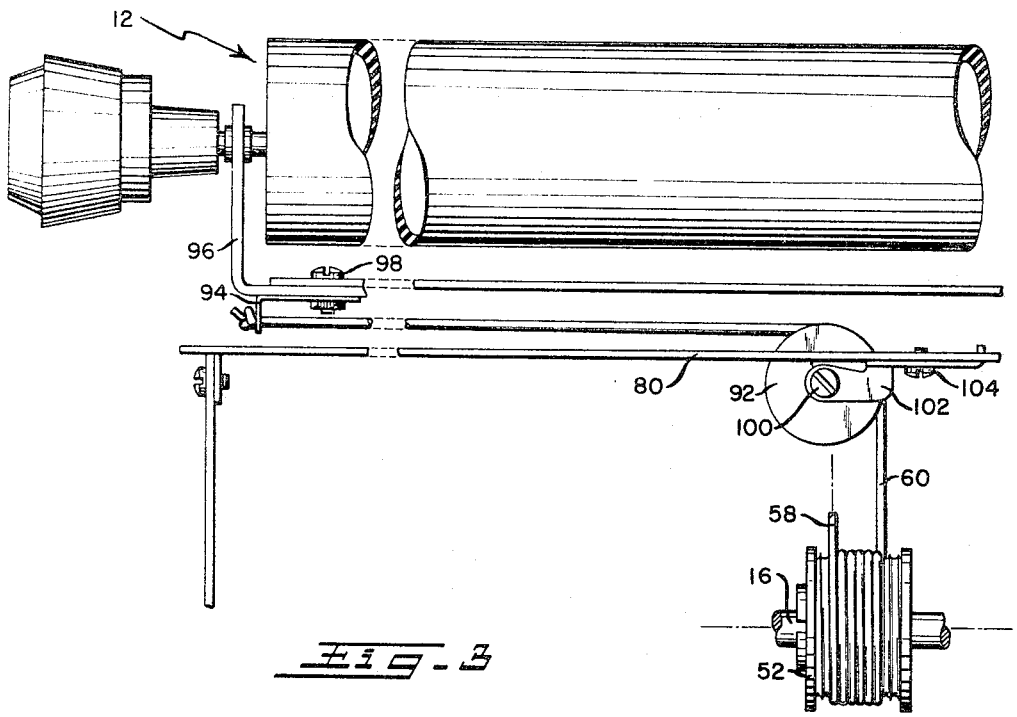
FIGURE 3 is a partial front plan view showing a cable connected to the left carriage end for driving the carriage to the right.
Figure 4:
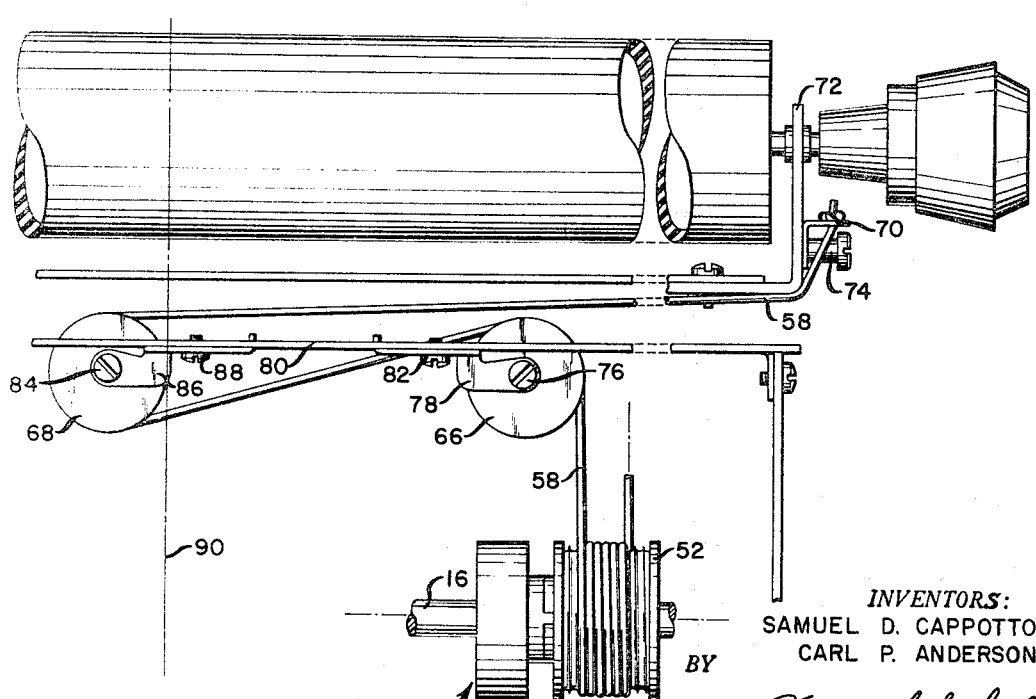
FIGURE 4 is a partial front plan view showing a cable connected to the right carriage end for governing the carriage to the left.

The carriage connecting means 20 includes a drum 52 rotatably mounted on shaft 16. Drum 52 is made of a plastic material and has a continuous groove 54 of several turns around its periphery. A cable 56 is folded together at a point intermediate its ends 58 and 60 and fed into an aperture 62 that extends through the wall and out the right end in order that a knot 64 may be tied at the folded end. Cable ends 58 and 60 are then pulled outward drawing the knot 64 in its assembled position shown in FIGURE 2. Referring to FIGURE 4, cable end 58 is wrapped clockwise around drum 52 in the groove 54, directed toward the left over a pulley 66, around another pulley 68 and back toward the right and rigidly tied to the right carriage end to a bracket 70 which is adjustably assembled to the right carriage end frame 72 by a screw 74. Bracket 70 is adjustable by being pivoted about screw 74 which can tighten or loosen cable end 58. Pulley 66 is pivotally supported on a shouldered screw 76 which is supported by a bracket 78 that is rigidly assembled to a machine frame member 80 by a screw 82. Pulley 68 is pivotally supported on a shouldered screw 84 which is supported by a bracket 86 that is rigidly assembled to frame member 80 by a screw 88. Pulley 68 is located to the left of the machine center line 90 to permit carriage 12 to move to the left beyond drum 52 without reversing the direction of rotation of the drum. Referring to FIGURE 3, cable end 60 is wrapped counterclockwise around drum 52 in groove 54, directed toward the left over a pulley 92 and rigidly tied to a bracket 94 which is rigidly assembled to the left carriage end frame 96 by a screw 98. Pulley 92 is pivotally supported on a shouldered screw 100 which is supported by a bracket 102 that is rigidly assembled to frame member 80 by a screw 104. As shown in FIGURES 2 and 5, a wheel 106 is rotatably mounted on shaft 16 to the left of drum 52. Wheel 106 has a metal bearing portion 108 with a pair of abutments 110 that engage mating recesses in drum 52 and has a plastic ring portion 112 (such as polyurethane) cemented to the bearing portion 108. Drum 52 and wheel 106 are held abutted against each other by the end of a gear 114 on the left side which is rigidly assembled to shaft 16 by a set screw 116 and by the end of a collar 118 on the right side which is rigidly assembled to shaft 16 by a set screw 120. Drum 52 and wheel 106 are normally free from rotation of shaft 16. Reference to the carriage connecting means 20 hereafter is to include wheel 106, drum 52, cable 56 and its connections to carriage 12.

*Tabulation*

By referring to FIGURES 1 and 2, the tabulator mechanism 22 will now be described. The depression of tabulator bar 150 pulls a link 152 forward by a conventional linkage (none shown). Link 152, being connected to the lower end of a bellcrank 154, pivots the bellcrank clockwise about its supporting shaft 156 which is rigidly assembled to the frame members by conventional means (none shown). A U-shaped bracket 158 is rigidly supported on shaft 156 and by a screw 160 (FIGURE 5). A shaft 162 (FIGURE 2) is pivotally supported in bracket 158 in apertures 164. An intermediate gear 166 is rigidly assembled to the left end of shaft 162 and is in constant engagement with gear 114. Another shaft 168 is pivotally supported in a U-shaped rocker 170 which is pivotally supported on shaft 162 and is positioned between the legs of U-shaped bracket 158. A gear 172 is rigidly assembled to the left end of shaft 168 and is in constant engagement with intermediate gear 166. A roller 174 made of a plastic material is rigidly cemented to shaft 168 between the legs of rocker 170. A pin 176 is rigidly assembled to rocker 170 and is located just behind the upper end of bellcrank 154.

Referring to FIGURE 2, the clockwise rotation of shaft 16 rotates intermediate gear 166 counterclockwise which, in turn, rotates gear 172 clockwise. Gear 172 rotates roller 174 clockwise at a rate determined by the speed reduction drive train 14 and the gear ratios of gears 114, 166 and 172. The clockwise movement of bellcrank 154 contacts pin 176 and pivots rocker 170 counterclockwise about shaft 162 thereby driving the rotating roller 174 into engagement with wheel 106. Gear 172 will remain in engagement with gear 166 by following its toothed circumference. The clockwise rotation of roller 174 drives wheel 106 counterclockwise about its axis which rotates drum 52 counterclockwise at the predetermined rate. The conventional linkage actuated by depressing tabulator bar 150 also disables the escapement which allows mainspring 23 to move the carriage in the letter feed direction. The rate of carriage travel under the influence of mainspring 23 is the aforementioned predetermined rate of tabulator mechanism 22. More precisely, the tabulator mechanism 22, being driven at a controlled rate, acts as a governor for controlling the rate of carriage travel due to the biasing force of the mainspring 23 being unable to increase the speed of the motor 32 and the remaining tabulator drive train.

The tabulator mechanism 22 is capable of directly driving the carriage in the letter feed direction at the predetermined rate without the use of mainspring 23 by the above described power drive train.

Releasing tab bar 150 returns bellcrank 154 counterclockwise thereby releasing pin 176. A spring 178 having one end connected to bracket 158 and the other end connected to rocker 170 biases rocker 170 clockwise about shaft 162 to its normal inoperative position.

*Space glide*

Referring now to FIGURES 1 and 5, the space glide means 26 will now be described. The depression of the space bar 250 to a depth beyond the normal single space depth pulls a link 252 forward by a conventional linkage (none shown). Link 252 pivots a bellcrank 254 counterclockwise about shaft 156. A space glide U-shaped rocker 256 has its left leg pivotally supported on a hub portion 257 integrally extending from a plastic molded gear 258 which is pivotally supported in aperture 260 of bracket 158 and has its right leg pivotally supported on a shaft 262 which is pivotally supported in aperture 264 of bracket 158. A smaller gear 266 is integrally molded on the right side of hub 257. The unitary member consisting of gear 258, hub 257 and gear 266 is mounted at the left end of shaft 262. Another shaft 268 is supported at each end in rocker 256 and extends through elongated apertures 270. A gear 272 is integral with a roller 274 which is pivotally mounted on shaft 268. Gear 272 is in constant engagement with gear 266 and gear 258 is in constant engagement with gear 114 on shaft 16.

Linkage 28 for disabling the escapement includes a link 276 pivotally connected to bellcrank 254 at its front end by a stud 278 and pivotally connected to an actuator 280 at its rearward end by a stud 282. Actuator 280 is pivotally supported on a bracket 284 by a stud 286 and has a finger 288 extending over an escapement trip arm 290.

The counterclockwise movement of bellcrank 254 drives link 276 rearward which pivots actuator 280 clockwise about stud 286 causing finger 288 to rock arm 290 downward for disabling a conventional carriage controlling escapement (not shown). The counterclockwise movement of bellcrank 254 also pulls a spring 292, having one end connected to a forward extending arm 294 of rocker 256 and the other end connected to a forward extending arm 296 of bellcrank 254, downward which pivots rocker 256 counterclockwise about shaft 262. Rocker 256 causes gear 272 to follow the toothed circumference of gear 266 and drive roller 274 into engagement with wheel 106.

The clockwise rotation of shaft 16 rotates gear 258 counterclockwise which, in turn, causes gear 266 to rotate gear 272 clockwise. The clockwise rotation of gear 272 causes roller 274 to drive wheel 106 and drum 52 counterclockwise about its axis at the rate determined by this space glide drive train. Since the escapement is disabled, mainspring 23 moves the carriage in the letter feed direction. The rate of carriage travel is now governed by the space glide drive train of the space glide means 26 due to the biasing force of mainspring 23 being unable to increase the speed of the motor 32 and the remaining space glide drive train. This rate is less than the tabulator rate for an improved control of advancing the carriage at short intervals. The space glide rate is less due to a greater speed reduction of gears 258, 266 and 272 with a smaller diameter roller 274 than the previously described tabulation speed reduction. This space glide rate is approximately three times faster than the rate of an automatic repeat space bar stepping action.

The space glide means 26 is capable, as is the tabulator mechanism 22, of directly driving the carriage in the letter feed direction at the predetermined rate without the use of mainspring 23 by the above described space glide drive train.

When releasing space bar 250, the conventional linkage returns bar 250 to its normal position. A spring 298, having one end connected to rocker 256 and the other end to a rocker 300, biases rocker 256 clockwise about shaft 262 to a normal position determined by the upper edge 302 of the right leg of rocker 256 abutting against a stop 304 formed from bracket 158. Rocker 300 is pivotally supported but is normally held in a stationary position by a link 356, a bellcrank 354, a link 352, and other linkage not shown.

It can now be seen that this novel carriage control means includes: a tabulator means for moving the carriage in the letter feed direction at a predetermined rate and a space glide means, which eliminates the repeat space bar stepping action, for moving the carriage in the letter feed direction at a rate less than the tabulator rate.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by Letters Patent is:

1. A typewriter or the like having a movable carriage comprising:
    a spring motor (23) operable to move the carriage in a tabulating direction;
    a continuously rotatable power source (16);
    a first speed reduction gear train (22, 106) selectively operable to couple the carriage to said power source for governing the rate of carriage travel at a predetermined rate when the carriage advances in the tabulation direction under the influence of said spring motor, said first gear train including a first roller friction means (174, 106) for coupling the carriage to said power source; and
    a second speed reduction gear train (26, 106) selectively operable to couple the carriage to said power source for governing the rate of carriage travel at a rate less than said predetermined rate when the carriage advances in the tabulation direction under the influence of said spring motor, said second gear train including a second roller friction means (274, 106) for coupling the carriage to said power source.

2. A typewriter as defined in claim 1 wherein said first roller friction means includes a wheel (106) rotatable concomitantly with the carriage travel when the carriage advances under the influence of said spring motor (23); a roller (174) rotatable by said power source (16); and selectively operable means (150, 152, 154, 170) for coupling said roller with said wheel.

3. A typewriter as defined in claim 2 wherein said wheel (106) includes a synthetic material ring portion engageable by said roller (174).

4. A typewriter as defined in claim 2 wherein said roller (174) is made of synthetic material.

5. A typewriter as defined in claim 2 wherein said selectively operable means includes a rocker member (170) pivotally supporting said roller (174) and being operable to carry said roller into engagement with said wheel (106).

6. A typewriter as defined in claim 1 wherein said second roller friction means includes a wheel (106) rotatable concomitantly with the carriage travel when the carriage advances under the influence of said spring motor (23); a roller (274) rotatable by said power source (16); and selectively operable means (250, 252, 254, 292, 294) for coupling said roller with said wheel.

7. A typewriter as defined in claim 6 wherein said roller (274) is made of synthetic material.

8. A typewriter as defined in claim 6 wherein said selectively operable means includes a rocker member (256) pivotally supporting said roller (274) and being operable to carry said roller into engagement with said wheel.

References Cited
UNITED STATES PATENTS

| | | | |
|---|---|---|---|
| 1,041,217 | 10/1912 | Woodward | 197—64 |
| 1,132,558 | 3/1915 | Carlin | 197—176 |
| 1,753,195 | 4/1930 | Bache et al. | 197—64 |
| 2,236,608 | 4/1941 | Pitman | 197—64 |
| 2,279,141 | 4/1942 | Kittel | 197—82 X |
| 2,315,689 | 4/1943 | Davidson | 197—66 X |
| 2,701,632 | 2/1955 | Zint | 197—84 |
| 2,724,479 | 11/1955 | Durkee | 197—68 |
| 2,854,124 | 9/1958 | Dodge et al. | 197—183 |
| 2,879,876 | 3/1959 | Palmer et al. | 197—16 |
| 2,909,935 | 10/1959 | Dodge | 197—64 X |

ROBERT E. PULFREY, *Primary Examiner.*

E. T. WRIGHT, *Assistant Examiner.*